(12) United States Patent
Bouvier (10) Patent No.: US 7,774,522 B2
(45) Date of Patent: Aug. 10, 2010

(54) CACHE STASHING PROCESSOR CONTROL MESSAGES

(75) Inventor: Daniel L. Bouvier, Austin, TX (US)

(73) Assignee: Applied Micro Circuits Corporation, San Diego, CA (US)

( * ) Notice: Subject to any disclaimer, the term of this patent is extended or adjusted under 35 U.S.C. 154(b) by 159 days.

(21) Appl. No.: 12/272,177

(22) Filed: Nov. 17, 2008

(65) Prior Publication Data

US 2010/0125677 A1 May 20, 2010

(51) Int. Cl.
*G06F 5/00* (2006.01)
*G06F 13/00* (2006.01)

(52) U.S. Cl. .......................... 710/55; 711/141
(58) Field of Classification Search ............. 710/52–57; 711/141–145, 113, 118
See application file for complete search history.

(56) References Cited

U.S. PATENT DOCUMENTS

| | | | | |
|---|---|---|---|---|
| 4,504,902 A | * | 3/1985 | Gallaher et al. ............. 711/135 |
| 4,899,275 A | * | 2/1990 | Sachs et al. ..................... 711/3 |
| 5,222,224 A | * | 6/1993 | Flynn et al. .................. 711/144 |
| 5,860,111 A | * | 1/1999 | Martinez et al. ............. 711/143 |
| 5,951,657 A | * | 9/1999 | Wood et al. .................... 710/55 |
| 6,029,212 A | * | 2/2000 | Kessler et al. ................. 710/52 |
| 6,223,255 B1 | * | 4/2001 | Argade ........................ 711/129 |

* cited by examiner

*Primary Examiner*—Christopher B Shin
(74) *Attorney, Agent, or Firm*—Law office of Gerald Maliszewski; Gerald Maliszewski (57) ABSTRACT

A system and method have been provided for pushing cacheable control messages to a processor. The method accepts a first control message, identified as cacheable and addressed to a processor, from a peripheral device. The first control message is allocated into a cache that is associated with the processor, but not associated with the peripheral device. In response to a read-prompt the processor reads the first control message directly from the cache. The read-prompt can be a hardware interrupt generated by the peripheral device referencing the first control message. For example, the peripheral may determine that the first control message has been allocated into the cache and generate a hardware interrupt associated with the first control message. Then, the processor reads the first control message in response to the hardware interrupt read-prompt. Alternately, the read-prompt can be the processor polling the cache for pending control messages.

22 Claims, 5 Drawing Sheets

| Cache Index | Cache Tag | Data | |
|---|---|---|---|
| 0001 | F001 | <u>302a</u> | First Control Word |
| 0002 | E211 | <u>302b</u> | Second Control Word |
| 0003 | 0011 | <u>302c</u> | Third Control Word |
| ⋮ | ⋮ | | ⋮ |
| 000a | F00n | <u>302j</u> | Fourth Control Word |

300a

300b

⋮

300k

Cache 206

Cache Controller 216

CACHE STASHING PROCESSOR CONTROL MESSAGES

BACKGROUND OF THE INVENTION

1. Field of the Invention

This invention generally relates to digital processing devices and, more particularly, to a system and method for caching control messages between peripheral devices and a processor.

2. Description of the Related Art

General purpose processor performance is measured simply as the time to execute a software program. The executed software program is made up of a finite set of instructions. The processor executes the software program using some number of clock cycles per instruction (CPI), where a cycle is based on a specific time interval called the cycle time. Multiplying the number of instructions to be executed by CPI, by cycle time, results in the execution time of the program. The resulting number is the processor performance.

The CPI of the processor is determined by a set of variables. A software program is made up of a combination of different instruction types including load/store instructions, data manipulation instructions, and comparison instructions. Each instruction type may require a different number of cycles to execute. Certain instructions, namely load and store operations, are dependent on outside factors, and the number of cycles to be performed is unknown. This unknown wait-time factor is referred to as the latency in satisfying the load or store operations.

A modern high performance CPU uses several techniques in order to reduce the number of cycles per instruction. These techniques attempt to exploit instruction level parallelism by executing non-dependent code sequences in parallel and out of order with respect to each other. This parallel execution is commonly referred to as superscalar execution. Another common technique is to exploit out of order-ness with respect to load and store operations and the actual completion of these operation to the memory system. This technique is commonly referred to as a weakly ordered memory system. However, certain control aspects of computing require that load and store operations complete in the strict order that they were issued by the software code. This is especially true if the software being executed by the processor is communicating with a peripheral input/output (IO) device. Forcing the ordering of operations in an out-of-order processor with weakly ordered memory system causes certain performance degradation and reduces the average CPI of the processor, thus lowering execution performance.

As an example, a software driver code may be required to set up a direct memory access (DMA) engine using a series of load and store operations to a set of registers. This set of load and store operations is referred to as Programmed IO (PIO). For such operations, strict completion ordering is required to make sure that the DMA engine is programmed correctly. These operations, therefore, can be thought of as being carried out in an atomic manner.

If the software program is dominated by a high ratio of PIO to computational code, then the overall performance is impacted by how efficient the PIO is carried out. As stated earlier, such PIO operations are usually dominated by the latency in accessing the remote device. As processor frequency increases, the resulting latency increases linearly. If nothing is done to reduce this latency then the overall performance scaling suffers. Therefore, new techniques must be deployed in order to reduce the dependency on PIO for the overall performance of the processor.

Another aspect impacting performance is the communication of events from the peripheral IO device to the software. This communication is typically done using either an interrupt or polling mechanism. In the case of an interrupt, the processor suspends the current code execution and proceeds to execute the interrupt service routine (ISR). The ISR usually requires several load operations to capture status information about the event from the IO device, followed by some store operations to reset the status of the peripheral.

The modern microprocessor makes use of a hierarchy of one or more caches to help reduce the load/store latency impact to performance for code or data structures that are often accessed. Processor caches were devised to reduce the average access latency for software memory references, as applied to the Harvard Architecture based processor.

A cache is a temporary collection of digital data duplicating original values stored elsewhere. Typically, the original data is expensive to fetch, due to a slow memory access time, or to compute, relative to the cost of reading the cache. Thus, cache is a temporary storage area where frequently accessed data can be stored for rapid access. Once the data is stored in the cache, the cached copy can be quickly accessed, rather than re-fetching or recomputing the original data, so that the average access time is lower.

Caches have proven to be extremely effective in many areas of computing because access patterns in typical computer applications have locality of reference. A CPU and hard drive frequently use a cache, as do web browsers and web servers.

Figure 1:
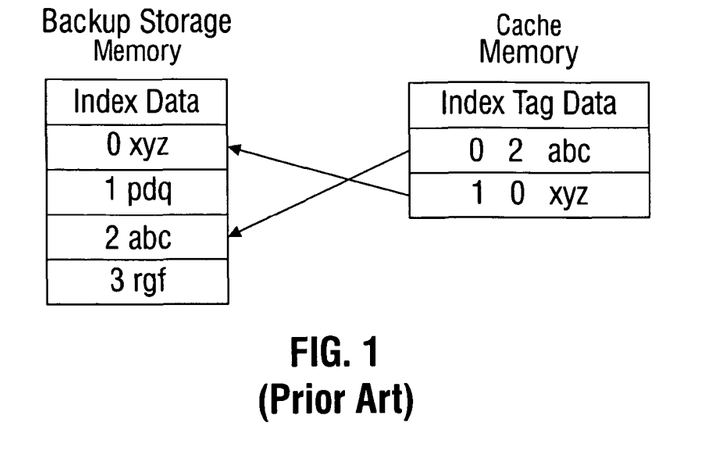
FIG. 1 is a diagram of a cache memory associated with a CPU (prior art).

FIG. 1 is a diagram of a cache memory associated with a CPU (prior art). A cache is made up of a pool of entries. Each entry has a datum or segment of data which is a copy of a segment in the backing store. Each entry also has a tag, which specifies the identity of the segment in the backing store of which the entry is a copy.

When the cache client, such as a CPU, web browser, or operating system wishes to access a data segment in the backing store, it first checks the cache. If an entry can be found with a tag matching that of the desired segment, the segment in cache is accessed instead. This situation is known as a cache hit. So for example, a network routing program might need to look up a route entry in a table at a particular address in memory. The hardware first checks the cache tag to see if a copy of the entry is already resident. If so, then the request is serviced directly from the segment pointed to by the tag and a longer memory access latency is avoided. Alternately, when the cache is consulted and found not to contain a segment with the desired tag, a cache miss results. The segment fetched from the backing store during miss handling is usually inserted into the cache, ready for the next access.

When a data segment is written into cache, it is typically, at some point, written to the backing store as well. The timing of this write is controlled by what is known as the write policy. In a write-through cache, every write to the cache causes a write to the backing store. Alternatively, in a write-back cache, writes are not immediately mirrored to the store. Instead, the cache tracks which of its locations (cache lines) have been written over. The segments in these "dirty" cache lines locations are written back to the backing store when those data segments are replaced with a new segment. For this reason, a miss in a write-back cache will often require two memory accesses to service: one to retrieve the needed segment, and one to write replaced data from the cache to the store.

The data in the backing store may be changed by entities other than the cache, in which case the copy in the cache may become out-of-date or stale. Alternatively, when the client updates the data in the cache, copies of that data in other caches will become stale. Communication protocols between the cache managers which keep the data consistent are known as coherency protocols. CPU caches are generally managed entirely by hardware.

In contrast to cache, a buffer is a temporary storage location where a large block of data is assembled or disassembled. This large block of data may be necessary for interacting with a storage device that requires large blocks of data, or when data must be delivered in a different order than that in which it is produced, or when the delivery of small blocks is inefficient. The benefit is present even if the buffered data are written to the buffer only once and read from the buffer only once. A cache, on the other hand, is useful in situations where data is read from the cache more often than they are written there. The purpose of cache is to reduce accesses to the underlying storage.

As noted above, caching structures are often used in computer systems dealing with persistent data. The processor loads the data into the cache at the start of, and during processing. Access latencies are improved during processing as the cache provides a store to hold the data structures closer to the processor than the main memory. The conventional cache line replacement algorithms select segments based upon the order in which elements were loaded or accessed within the cache. However, these replacement algorithms are not necessarily efficient for transient data. Conventionally, transient data is either located within the main (off chip) data store and/or within on-chip buffers or queues. The management of these on-chip resources can be complicated with the sizing of on-chip storage. It is difficult to determine and map the different addresses required between the on-chip and off-chip stores.

Allocation of data into the cache is normally done based on a load or store reference by software, executing on a computer processor unit (CPU), to a specific address region that is marked as "cacheable". Whenever a cacheable address is referenced, a cache controller first looks up the address in the cache tag. If the address is not currently in cache, then the cache controller permits the memory access to continue to the next level of the memory system, to fetch the required data (cache line). At some later point, the data is loaded into the cache along with completing and satisfying the original software request for a portion or all of the data. A typical processor implementation allocates data into a cache by reading or writing a data element to/from memory that is marked as cacheable. The memory subsystem brings a copy of the memory into the cache as it is being delivered to the processor.

However, the above-described caching scheme is inefficient for embedded communications processing, as time is wasted waiting for transient data to be loaded into the cache. For example, in packet processing, an ingress packet is first written to a data buffer in main memory. Subsequently, the software being executed by the processor is alerted by an Ethernet DMA engine that a packet has been posted, usually by means of an interrupt. The processor takes the exception and software reads some status and control information in the Ethernet controller to determine the reason for the interrupt. Next, the executing software begins reading the packet header to perform packet classification. All of these reads are high in latency and serialize the packet processing time.

To combat the inefficiencies in the cache replacement of transient data, a cache "stashing" technique may be employed that prevents elements in cache from being replaced in accordance with an LRU replacement policy until "unlocked" by an external processor. Cache stashing is a technique where another processing element (such as a DMA engine) allocates a cache line into a cache that belongs to another processor, on behalf of that processor, based upon the assumption that the processor will use the data at a later time. Rather than waiting for the executing software to "touch" a particular address in order to allocate it into a cache, the cache controller is modified to allow DMA agents to allocate data into the cache. This allocation means that when a DMA agent is writing data to memory, it marks the transaction as "stash-able." The stashable marking indicates to the cache controller that the data elements can be put into the cache while the memory system is pushing the data to main memory. Later on, when software goes to access the packet data, the packet data is already present in the cache, thus eliminating some of the latency that would have otherwise occurred in fetching the data all the way from main memory.

By moving a copy of packet data closer to the processor temporally, the access penalty can be reduced. While the concept has been applied to the generic movement of data from DMA agents to main memory, the technique is not directly applicable to control and status registers, which must always reflect the current state of the remote peripheral. Therefore, PIO can rarely leverage the advantage of the cache hierarchy.

For example, a peripheral may have many control and status registers associated with it. Conventionally, software execution must perform load and stores atomically to these registers in order to access and/or control the peripheral. The latency and overhead to deal with these operations is becoming a bigger contributor to the performance scaling.

It would be advantageous if control and status register information could be allocated to cache in a manner similar to the way raw data structures are allocated.

SUMMARY OF THE INVENTION

The caching system disclosed herein extends the concept of data stashing to permit control and status information to be stashed from a peripheral. The process improves processor instruction execution performance by reducing the latency overhead associated with communications between software and peripheral devices. More explicitly, dependence on latency bound PIO operations is reduced, improving overall program execution performance. A reduction in memory overhead and bus blocking occurs. The act of pushing the control and status information into the cache, using stashing, eliminates an extra memory access that would have otherwise been required if reading the information back from memory. Likewise, the removal of PIO operations between peripheral and processor reduces bus blocking overhead due to the long access latency inherent in those transactions.

Accordingly, a method is provided for pushing cacheable control messages to a processor. The method accepts a first control message, identified as cacheable and addressed to a processor, from a peripheral device. The first control message is allocated into a cache that is associated with the processor, but not associated with the peripheral device. In response to a read-prompt the processor reads the first control message directly from the cache. The read-prompt can be a hardware interrupt generated by the peripheral device referencing the first control message. For example, the peripheral may determine that the first control message has been allocated into the cache and generate a hardware interrupt associated with the first control message. Then, the processor reads the first control message in response to the hardware interrupt read-prompt. Alternately, the read-prompt can be the processor polling the cache for pending control messages.

In one aspect, the first control message is addressed to a first region in memory, and it is allocated into cache because a cache controller recognizes that control messages addressed to the first region in memory are cacheable control messages addressed for allocation into cache. In another aspect, the peripheral attaches a transaction attribute to the first control message, designating the first control message as cacheable. Then, the cache controller checks the transaction attribute attached to the first control message and allocates the first control message in response to reading the transaction attribute.

Additional details of the above-described method and a system for pushing control messages into a cache are provided below.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, generation, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A system on a chip (SoC) includes 1 or more processors integrated together with peripherals and co-processors.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 2:
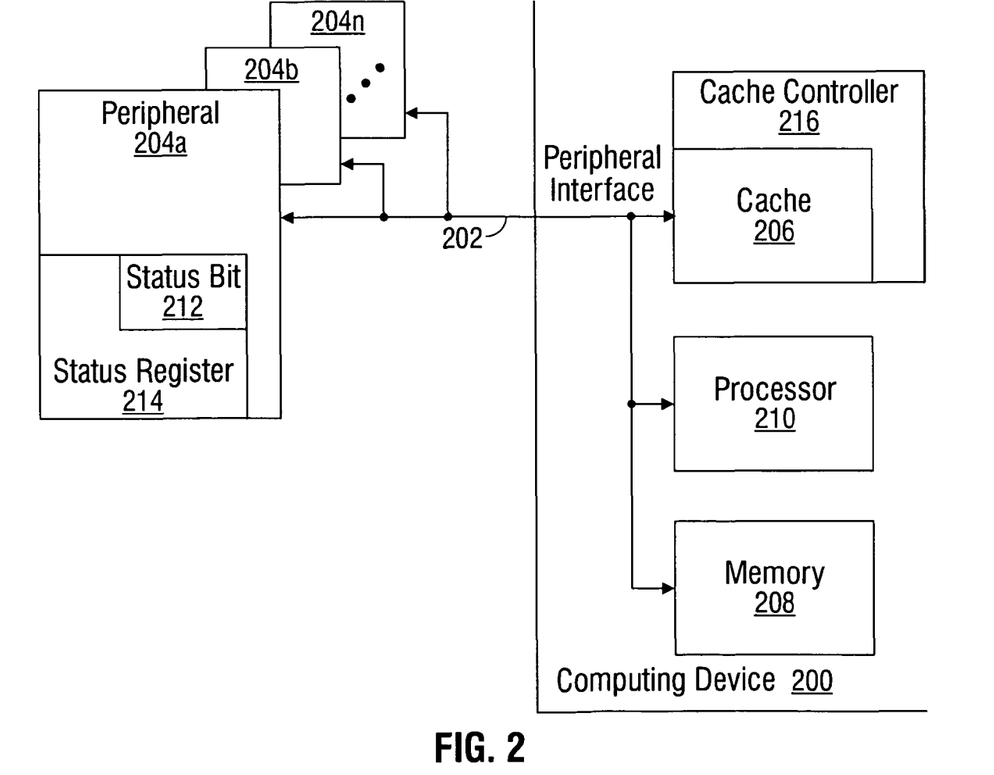
FIG. 2 is a schematic block diagram of a computing device with a system for pushing cacheable control messages to a processor.

FIG. 2 is a schematic block diagram of a computing device with a system for pushing cacheable control messages to a processor. The device 200 comprises a peripheral port on line 202 for accepting a first control message, identified as cacheable, from a peripheral device 204a addressed to a processor. The system also includes a cache 206 associated with a processor, but not the peripheral. Alternately stated, the cache 206 is assigned to one particular processor. The cache 206 has an interface on line 202 for accepting the first control message allocated to the cache. A memory 208 has an interface on line 202 to supply a stored application of software instructions. A processor 210 has an interface on line 202 to read the software instructions from memory 208 and execute the instructions. The processor 210 reads the first control message directly from the cache 206 in response to a read-prompt, which is either a hardware interrupt generated by the peripheral device 204a referencing the first control message, or the processor 210 polling the cache 206 for pending control messages.

In other aspects (not shown), there is a processor coherence domain that is demarked by a separate coherent interconnect between processor(s), cache, and memory. A bridge connects the non-coherent peripheral interface into the coherence domain. Transactions that are marked as cacheable cross the bridge into the coherence domain. Transactions that are marked as non-cacheable proceed directly to memory bypassing the cache.

Some examples of control messages include instructions to the destination processor from the source processor, a pointer to a data unit, packet metadata, a state of a processor, or a record of processing by a processor. Other examples include an interrupt vector or program change in direction message. Another example might be a change in state of the peripheral such as a message denoting start or completion of a task. A peripheral device is defined herein as any device capable of sourcing control messages that are sent to the processor 210 or any device capable of acting as a control message destination. A processor is capable of reading software instructions and executing those instructions. Some examples of processors and peripherals include microprocessors, encryption engines, protocol offload engines, DSPs, logic-coded state machines, or direct memory access (DMA) engines. Some examples of a logic-coded state machine may include an Ethernet sub-system or other IO interface. Further, the logic-coded state machine may also be a baseband processor or codec.

In one aspect, the processor 210 generates a second control message addressed to the peripheral device 204a, which is identified as cacheable. The cache 206 accepts the second control message allocated to the cache and supplies the second control message directly to the peripheral 204a in response to a read-prompt. The read-prompt may be a result of the processor 210 writing a status bit in the peripheral 204a referencing the second control message, or the cache 206 may receive a poll from the peripheral 204a for pending control messages.

In another aspect, the peripheral port on line 202 accepts a plurality of control messages identified as cacheable, from a corresponding plurality of peripheral devices. Shown are peripheral devices 204a, 204b, and 204n. However, it should be understood that n is not limited to any particular value. The cache 206 is not associated with peripheral devices 204a-204n, but accepts the plurality of control messages allocated into cache. The processor 210 reads each control message directly from cache in response to a read-prompt referencing a corresponding control message.

In another aspect, the peripheral port on line 202 accepts a plurality of control messages identified as cacheable, from the peripheral device 204a. The cache 206 accepts the plurality of control messages allocated into cache, and the processor 210 reads each control message directly from cache in response to a read-prompt referencing a corresponding control message.

Note that the peripherals may either be integrated into the same silicon in the form of an SoC or be externally located in a separate IO device. Note also that the system may enable more than just a single processor as well as more than a single cache (see FIG. 5). Such a scheme requires the addition of steering attributes to indicate in which cache controller the results are stashed.

Figure 3:
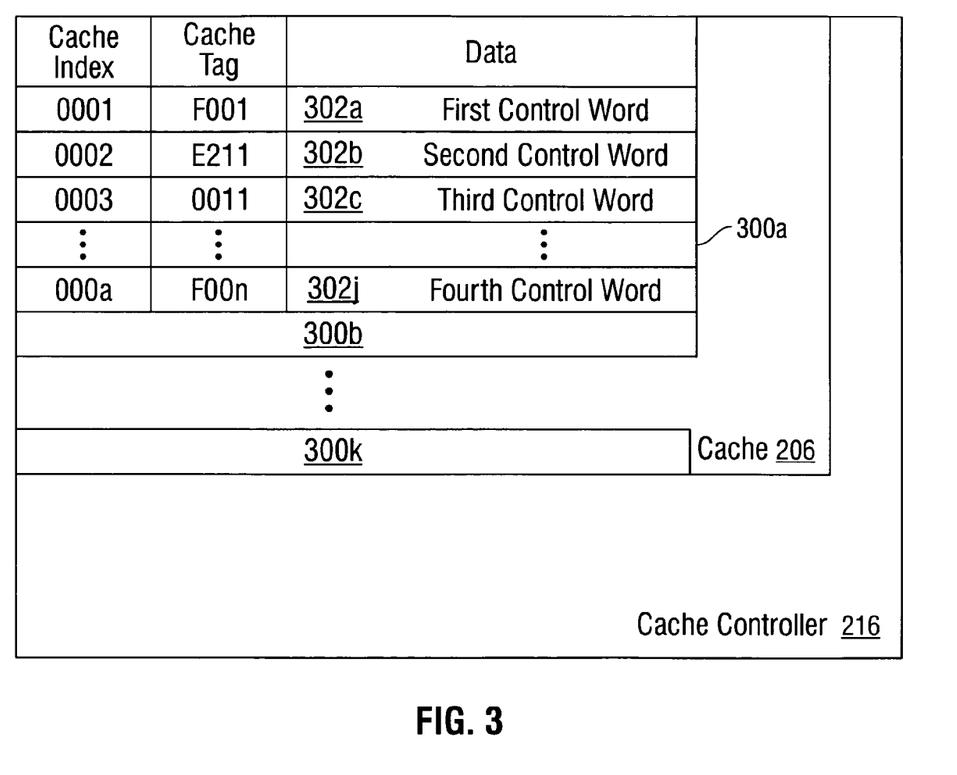
FIG. 3 is a schematic block diagram detailing the cache of FIG. 2.

FIG. 3 is a schematic block diagram detailing the cache 206 of FIG. 2. The cache 206 includes a set of memory locations 300a through 300k, where k is not limited to any particular value. The cache 206 fills the parallel entries, or cache lines in the set of memory locations with the plurality of control messages, for serial delivery to the processor. Shown are parallel entries 302a through 302j. Again, j is not necessarily limited to the value of 4. First, second, third, and fourth control messages (words) are shown in the parallel entries.

Returning to FIG. 2, the processor 210 writes an acknowledgement status bit to the peripheral in response to reading the first control message from one of the parallel entries in the set of memory locations in cache. For example, status bit 212 is written into status register 214 in response to the processor reading the first control messages from cache entry 302a (see FIG. 3). As a result, the cache 206 receives a new control message from the peripheral overwriting the first control message.

In a different aspect, the cache controller 216 supplies an allocation message to the peripheral port on line 202, addressed to the peripheral 204, indicating that the first control message has been allocated into the cache 206. More explicitly, the peripheral performs a "normal" write operation to memory, but marks the message as cacheable and stashable. When the cache controller "sees" the transaction, it allocates it or writes the data into the cache. The acknowledgement is usually just a transaction ACK as part of the bus protocol. There is no higher level allocation "message" per-se. Then, the computing device peripheral port receives a hardware read-prompt from the peripheral in response to the allocation message, and the processor 210 reads the first control message directly from the cache in response to the hardware interrupt read-prompt.

In another aspect, the peripheral port on line 202 accepts a control message addressed to a first region in (main or backup) memory 208. Cache controller 216 has an interface on line 202 for recognizing the first control message destination address, and in response to the recognition, allocating the first control message into cache 206.

A control message is a generic data structure that has a unique meaning between the processor and the peripheral. The message is likely to have a generic header that identifies the message. This is used by the peripheral or software, depending on the direction of communication, to indicate what the context of the message is about (for example a register pointer). It might include a sequence number so that the devices can keep track of the order of events in the case of a weakly ordered system. They then would include the context specific information such as status and control bits. For example, a peripheral may include many control and status registers that are address mapped. These registers are simply being exported from the peripheral to the CPU and visa versa. It is most convenient if the messages are cache-line size or smaller so that they can be dealt with as an atomic unit within the system.

In a different aspect, the peripheral port on line 202 accepts a transaction attribute attached to the first control message, designating the first control message as cacheable. In this aspect, the cache controller 216 checks the transaction attribute and allocates a control message into cache 206 in response to reading the transaction attribute. The transaction attribute can be a message transferred on the same data bus as the control messages.

A transaction attribute is a single or multiple bit structure associated with a transaction on an interconnect that indicates to the receiver the attributes of the transaction. The simplest form of a transaction attribute is a read/write indicator which tells the receiver what sort of transaction to carry out. Two additional attributes are the indicators of "cacheable" and "stash-able", which are used by the cache controller to determine the treatment of the transaction.

Figure 4:
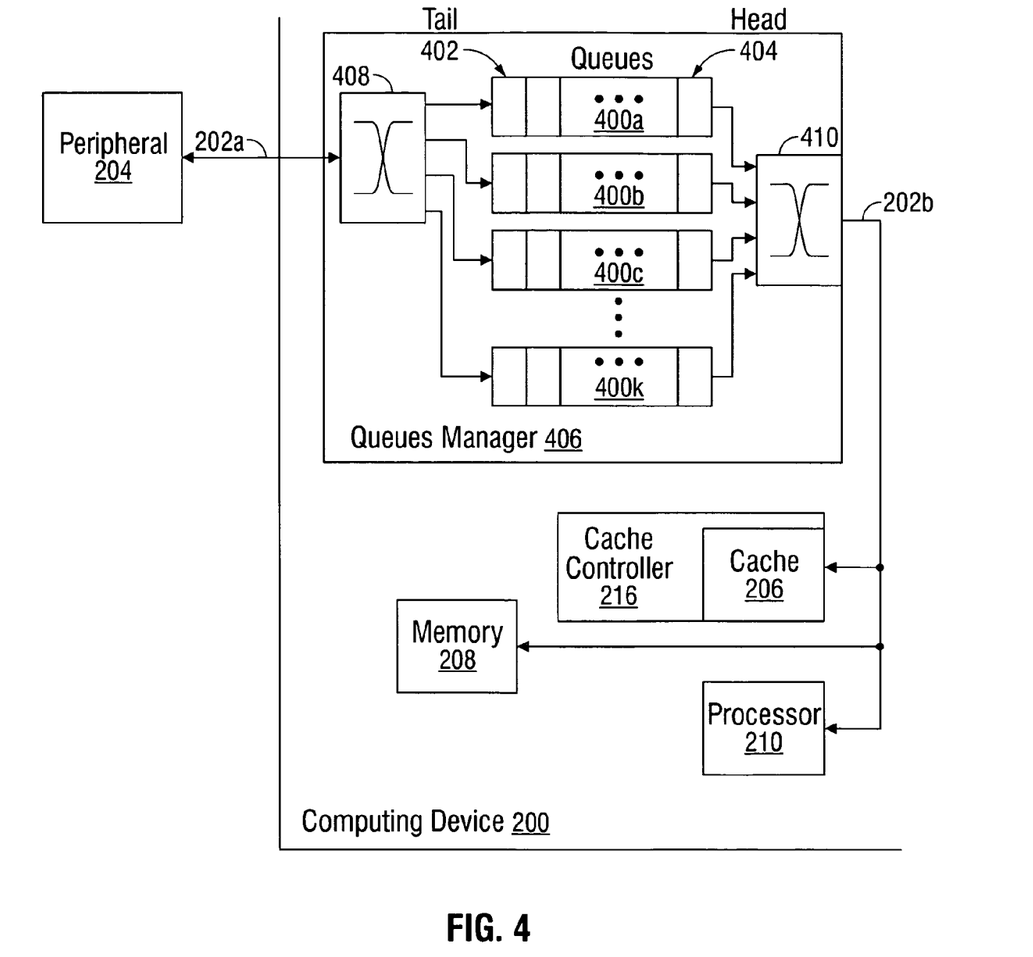
FIG. 4 is a schematic block diagram depicting a variation of the cache pushing system of FIG. 2.

FIG. 4 is a schematic block diagram depicting a variation of the cache pushing system of FIG. 2. Shown is a plurality of prioritized first-in first-out (FIFO) queues 400 associated with the processor. Queues 400a through 400k are shown, where k is not limited to any particular value. Queue 400a has a higher priority than queue 400b, and queue 400b has a higher priority than queue 400c. Each queue has a tail 402 to accept control messages from the peripheral port on line 202 and a head 404 to serially supply queued control messages. A queue manager 406 allocates cacheable control messages to the cache in response to detecting the control messages at the head of FIFO queues. Control messages assigned to higher priority queues are typically allocated to cache before the control messages assigned to lower priority queues. Also shown are crossbars 408 and 410 to distribute and collect control messages to and from the queues.

The above-described Queue Manager is a centralized communication manager that utilizes hardware-managed queues through which messages to destination processors/coprocessors are passed. The QM maintains coherency and synchronization between multiple sources, and between source and destination accesses to the work queues. The QM provides a single shot access mechanism to source (enqueue) and destination (dequeue), which minimizes processor involvement. Strict message ordering is maintained without the requirement of queue communication channels or handshaking mechanisms.

The QM utilizes a one-to-one and/or a many-to-one queue assignment to simplify the message selection. Parallel class-based queues are supported between endpoints to enable differentiated access channels between processors and coprocessors. Message storage space is allocated by the QM on demand from centralized free pools. Multiple free pools (not shown) may be supported to allow under and over-subscribed domains.

Figure 5:
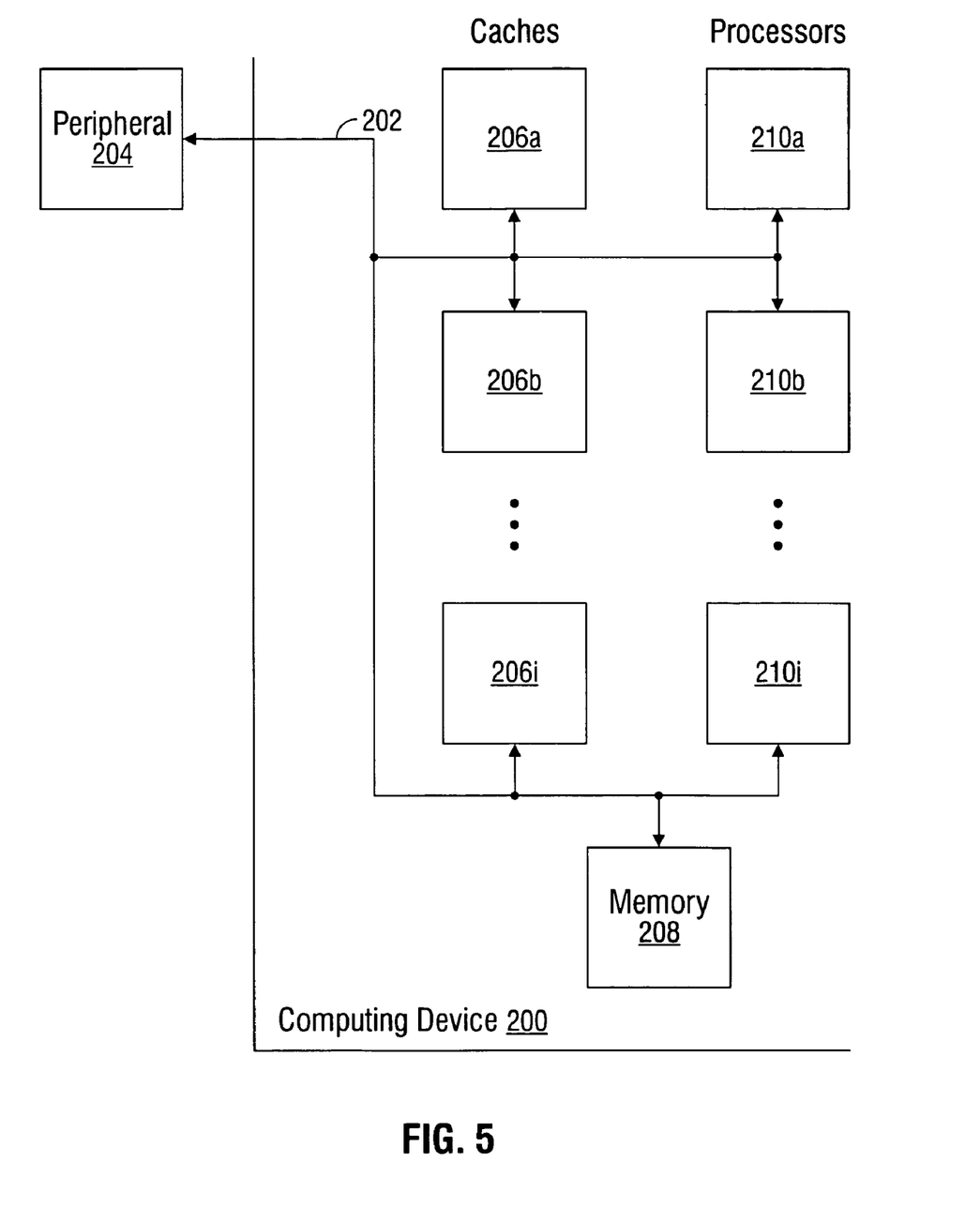
FIG. 5 is a schematic block diagram depicting another variation of the cache pushing system of FIG. 2.

FIG. 5 is a schematic block diagram depicting another variation of the cache pushing system of FIG. 2. Shown are a plurality of processors, 210a through 210i, where i is not limited to any particular value. Also shown are caches 206a through 206i. Each cache 206 is associated with a corresponding processor 210, but not with the peripheral device 204. In this aspect the peripheral port on line 202 accepts a plurality of control messages identified as cacheable, addressed to processors 210a through 210i. Each cache 206a through 206i accepts a corresponding allocated control message, and each processor 210a through 210i directly reads a control message from its corresponding cache in response to a read-prompt referencing the control message.

Although system 200 has been depicted as blocks of hardware, it should be realized that portions of the system may be embodied as processor instructors stored in memory that are executed by a processor or logic machine capable of operating on processor instruction code.

Functional Description

The present invention permits any peripheral to send its control and status information directly to a cache using stashing, even without an interposing QM. The scheme simply requires that the peripheral write the information to a memory address and mark the transaction (or address space) as stashable. In this way, when software is interrupted by the peripheral, the values for the status and control register are already loaded into the cache, thus, reducing fetch latency.

Likewise, when software (the processor) wants to update the peripheral, it can do so by writing the update to cacheable memory space. Subsequently, it can alert the peripheral that an update is pending and the peripheral can fetch the data from the memory location. As long as the cache is part of the memory hierarchy and visible to the peripheral, the update comes straight from the cache. In one aspect however, a QM is inserted between the peripheral and cache to handle more complex schemes where multiple peripherals share the same processor and the QM.

In cache, the control message can be given a tag to identify the sequence and order of messages. In the simplest scheme, a single memory location is used, to which only one control message at a time can be pushed. However, with only one memory location, the hardware must wait until the software is finished processing that message, before the next control message can be sent to cache. Therefore, in one aspect the cache includes a few entries (e.g., four). The use of four entries permits the hardware to post up to 4 messages for software, to further eliminate latency and handshake overhead.

Latency dependency is reduced as a result of moving many of the load and store operations involved with PIO to cached memory address space. This accomplishes two objectives: first, it reduces the latency required when executing load instructions from remote registers. Second, it reduces the dependency on serializing synchronization instructions to maintain strict completion order when carrying out atomic control sequences.

The control structure is memory mapped, and is most efficient if it can be contained within, and is byte aligned to a single cache line (typically but not restricted to 32 bytes or 64 bytes in size). The structure contains all of the necessary control information needed to communicate between software and the peripheral. Because the structure is located in cacheable memory space, the load and store operations needed to assemble the control structure require very little latency overhead.

Further, the invention makes use cache stashing. Whenever the peripheral needs to communicate with the processor, rather than waiting to be read directly, it simply writes the cacheable memory location and stashing the structure into memory. Software running on the processor can likewise write a structure that is cacheable and alert the peripheral with a simple write operation that an update has been posted. The peripheral can the fetch the update from cache.

If many updates are to occur at a rate faster than what the processor/peripheral can generate/consume, then a flow control mechanism can be employed. In addition, multiple entries in the form of a small queue can be included. This is done by including an ownership bit in the data structure along with a tag such that the producer and the consumer can keep track of who owns an entry and the update status.

Figure 6:
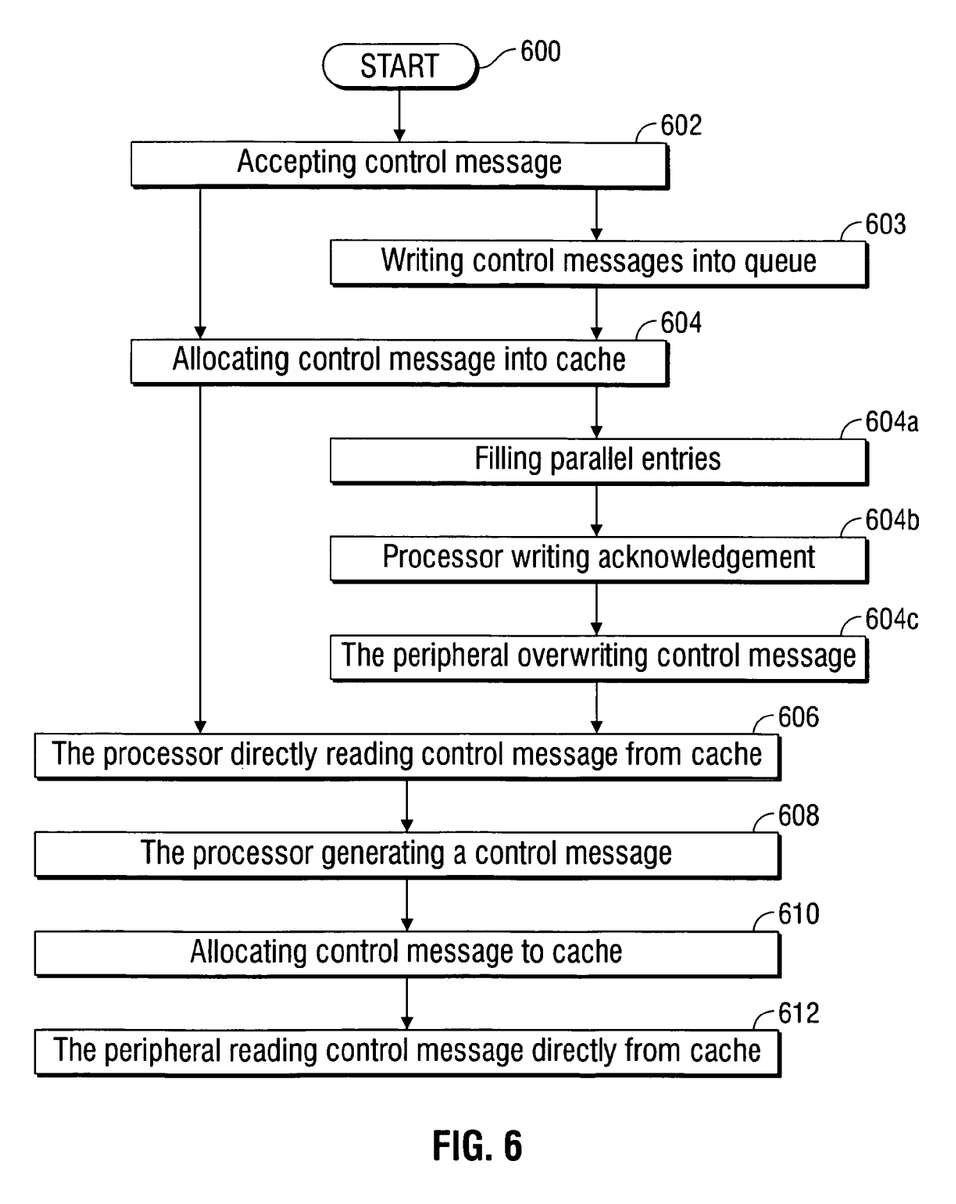
FIG. 6 is a flowchart illustrating a method for pushing cacheable control messages to a processor.

FIG. 6 is a flowchart illustrating a method for pushing cacheable control messages to a processor. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 600.

Step 602 accepts a first control message, identified as cacheable and addressed to a processor, from a peripheral device. Step 604 allocates the first control message into a cache that is associated with the processor, but not associated with the peripheral device. In response to a read-prompt, in Step 606 the processor reads the first control message directly from the cache. The read-prompt can be a hardware interrupt generated by the peripheral device referencing the first control message, or the processor polling the cache for pending control messages. For example, reading the first control message directly from the cache in response to the hardware interrupt includes the peripheral determining that the first control message has been allocated into the cache, and the peripheral generating a hardware interrupt associated with the first control message.

In one aspect, in Step 608 the processor generates a second control message addressed to the peripheral device and identified as cacheable. Step 610 allocates the second control message into the cache. In response to a read-prompt, in Step 612 the peripheral device reads the second control message directly from the cache. The read-prompt can be the processor writing a status bit in the peripheral referencing the second control message, or the peripheral polling the cache for pending control messages.

In one aspect, Step 602 accepts a plurality of control messages identified as cacheable, from a corresponding plurality of peripheral devices. Step 604 allocates the plurality of control messages into cache that is not associated with the plurality of peripheral devices, and in Step 606 the processor reads each control message directly from cache in response to a read-prompt referencing a corresponding control message. In another variation Step 602 accepts a plurality of control messages identified as cacheable, addressed to a first plurality of processors. Then, Step 604 allocates control messages into a first plurality of caches, each cache associated with a corresponding processor, and in Step 610 each processor directly reads a control message from its corresponding cache in response to a read-prompt referencing a corresponding control message.

In another aspect, Step 602 accepts a plurality of control messages identified as cacheable, from the peripheral device. Step 604 allocates the plurality of control messages into the cache, and in Step 606 the processor reads each control message directly from cache in response to a read-prompt referencing a corresponding control message.

For example, allocating the plurality of control messages into cache in Step 604 includes allocating the plurality of control messages as parallel entries into a set of memory locations in cache for serial delivery to the processor, as follows. Step 604a fills the parallel entries with control messages. In Step 604b the processor writes an acknowledgement status bit to the peripheral in response to reading the first control message from one of the parallel entries. In Step 604c the peripheral overwrites the first control message with a new control message.

In a different aspect, Step 602 accepts a first control message addressed to a first region in memory. Then, allocating the first control message into cache in Step 604 includes a cache controller recognizing that control messages addressed to the first region in memory are cacheable control messages addressed for allocation into cache. Alternately, in Step 602 the peripheral attaches a transaction attribute to the first control message, designating the first control message as cacheable. Then, in Step 604 a cache controller checks the transaction attribute attached to the first control message and allocates the first control message in response to reading the transaction attribute.

In a different aspect, prior to allocating the first control message into the cache, Step 603 writes the first control message into the tail of one of a plurality of FIFO prioritized queues associated with the processor and controlled by a QM. Then, allocating the first control message into cache in Step 604 includes allocating the first control message into cache in response to the QM detecting the pending first control message at the head of the queue.

A system and method have been provided for pushing cacheable control messages to a processor. Examples of specific messaging formats and hardware structures have been given to illustrate the invention. But the invention is not limited to just these examples. Other variations and embodiments of the invention will occur to those skilled in the art.

I claim:

1. A method for pushing cacheable control messages to a processor, the method comprising:
   accepting a first control message, identified as cacheable and addressed to a processor, from a peripheral device;
   allocating the first control message into a cache that is associated with the processor, but not associated with the peripheral device; and,
   in response to a read-prompt selected from a group consisting of a hardware interrupt generated by the peripheral device referencing the first control message and the processor polling the cache for pending control messages, the processor reading the first control message directly from the cache.

2. The method of claim 1 further comprising:
   the processor generating a second control message addressed to the peripheral device and identified as cacheable;
   allocating the second control message into the cache; and,
   in response to a read-prompt selected from a group consisting of the processor writing a status bit in the peripheral referencing the second control message and the peripheral polling the cache for pending control messages, the peripheral device reading the second control message directly from the cache.

3. The method of claim 1 wherein accepting the first control message includes accepting a plurality of control messages identified as cacheable, from a corresponding plurality of peripheral devices;
   wherein allocating the first control message into the cache includes allocating the plurality of control messages into cache that is not associated with the plurality of peripheral devices; and,
   wherein reading the first control message includes reading each control message directly from cache in response to a read-prompt referencing a corresponding control message.

4. The method of claim 1 wherein accepting the first control message includes accepting a plurality of control messages identified as cacheable, from the peripheral device;
   wherein allocating the first control message into the cache includes allocating the plurality of control messages into the cache; and,
   wherein reading the first control message includes reading each control message directly from cache in response to a read-prompt referencing a corresponding control message.

5. The method of claim 4 wherein allocating the plurality of control messages into cache includes allocating the plurality of control messages as parallel entries into a set of memory locations in cache for serial delivery to the processor.

6. The method of claim 5 wherein allocating the plurality of control messages as parallel entries into the set of memory locations in cache includes:
   filling the parallel entries with control messages;
   the processor writing an acknowledgement status bit to the peripheral in response to reading the first control message from one of the parallel entries; and,
   the peripheral overwriting the first control message with a new control message.

7. The method of claim 1 wherein accepting the first control message includes accepting a first control message addressed to a first region in memory; and,
   wherein allocating the first control message into cache includes a cache controller recognizing that control messages addressed to the first region in memory are cacheable control messages addressed for allocation into cache.

8. The method of claim 1 wherein accepting the first control message includes the peripheral attaching a transaction attribute to the first control message, designating the first control message as cacheable; and,
   wherein allocating the first control message into cache includes a cache controller checking the transaction attribute attached to the first control message and allocating the first control message in response to reading the transaction attribute.

9. The method of claim 1 further comprising:
   prior to allocating the first control message into the cache, writing the first control message into the tail of one of a plurality of first-in first-out (FIFO) prioritized queues associated with the processor and controlled by a queue manager (QM); and, wherein allocating the first control message into cache includes allocating the first control message into cache in response to the QM detecting the pending first control message at the head of the queue.

10. The method of claim 1 wherein accepting the first control message includes accepting a plurality of control messages identified as cacheable, addressed to a first plurality of processors;

wherein allocating the first control message into the cache includes allocating control messages into a first plurality of caches, each cache associated with a corresponding processor; and, wherein reading the first control message includes each processor directly reading a control message from its corresponding cache in response to a read-prompt referencing a corresponding control message.

11. The method of claim 1 wherein reading the first control message directly from the cache in response to the hardware interrupt includes:

the peripheral determining that the first control message has been allocated into the cache;

the peripheral generating a hardware interrupt associated with the first control message; and, the processor reading the first control message in response to the hardware interrupt read-prompt.

12. A computing device with a system for pushing cacheable control messages to a processor, the device comprising:

a peripheral port for accepting a first control message, identified as cacheable, from a peripheral device addressed to a processor;

a cache associated with a processor, but not the peripheral, having an interface for accepting the first control message allocated to the cache;

a memory having an interface to supply a stored application of software instructions; and, a processor having an interface to read the software instructions from memory and execute the instructions, the processor reading the first control message directly from the cache in response to a read-prompt selected from a group consisting of a hardware interrupt generated by the peripheral device referencing the first control message and the processor polling the cache for pending control messages.

13. The device of claim 12 wherein the processor generates a second control message addressed to the peripheral device and identified as cacheable; and, wherein the cache accepts the second control message allocated to the cache and supplies the second control message directly to the peripheral in response to a read-prompt selected from a group consisting of the processor writing a status bit in the peripheral referencing the second control message and the cache receiving a poll from the peripheral for pending control messages.

14. The device of claim 12 wherein the peripheral port accepts a plurality of control messages identified as cacheable, from a corresponding plurality of peripheral devices;

wherein the cache is not associated with the plurality of peripheral devices and accepts the plurality of control messages allocated into cache; and, wherein the processor reads each control message directly from cache in response to a read-prompt referencing a corresponding control message.

15. The device of claim 12 wherein the peripheral port accepts a plurality of control messages identified as cacheable, from the peripheral device;

wherein the cache accepts the plurality of control messages allocated into cache; and, wherein the processor reads each control message directly from cache in response to a read-prompt referencing a corresponding control message.

16. The device of claim 15 wherein the cache includes a set of memory locations, the cache filling the parallel entries in the set of memory locations with the plurality of control messages, for serial delivery to the processor.

17. The device of claim 16 wherein the processor writes an acknowledgement status bit to the peripheral in response to reading the first control message from one of the parallel entries in the set of memory locations in cache; and, wherein the cache receives a new control message from the peripheral overwriting the first control message.

18. The device of claim 12 wherein the peripheral port accepts the first control message addressed to a first region in memory; and, the device further comprising:

a cache controller having an interface for recognizing the first control message destination address, and in response to the recognition, allocating the first control message into cache.

19. The device of claim 12 wherein the peripheral port accepts a transaction attribute attached to the first control message, designating the first control message as cacheable; and, the device further comprising:

a cache controller having an interface for checking the transaction attribute and allocating the first control message into cache in response to reading the transaction attribute.

20. The device of claim 12 further comprising:

a plurality of prioritized first-in first-out (FIFO) queues associated with the processor, each queue having a tail to accept control messages from the peripheral port and a head to serially supply queued control messages; and, a queue manager allocating cacheable control messages to the cache in response to detecting the control messages at the head of FIFO queues.

21. The device of claim 12 further comprising:

a plurality of processors;

a plurality of caches, each cache associated with a corresponding processor, but not with the peripheral device;

wherein the peripheral port accepts a plurality of control messages identified as cacheable, addressed to the plurality of processors;

wherein each cache accepts a corresponding allocated control message; and, wherein each processor directly reads a control message from its corresponding cache in response to a read-prompt referencing the control message.

22. The device of claim 12 further comprising:

a cache controller having an interface to supply an allocation message to the peripheral port, addressed to the peripheral, indicating that the first control message has been allocated into the cache; and, wherein the peripheral port receives a hardware read-prompt from the peripheral in response to the allocation message; and, wherein the processor reads the first control message directly from the cache in response to the hardware interrupt read-prompt.

* * * * *